United States Patent [19]

Thomey

[11] Patent Number: 5,045,031

[45] Date of Patent: Sep. 3, 1991

[54] TENSIONER FOR AN ENDLESS POWER TRANSMISSION MEMBER AND SYSTEM

[75] Inventor: Henry W. Thomey, Windsor, Canada

[73] Assignee: Gates Power Drive Products, Inc., Bloomfield Hills, Mich.

[21] Appl. No.: 588,245

[22] Filed: Sep. 26, 1990

[51] Int. Cl.⁵ .............................................. F16H 7/08
[52] U.S. Cl. ................................................. 474/138
[58] Field of Search ........ 474/101, 109, 111, 113–117, 474/133, 135, 136

[56] References Cited

U.S. PATENT DOCUMENTS 3,413,866 12/1968 Ford ..................................... 474/138
4,509,296 4/1985 Rasmussen ...................... 474/138 X Primary Examiner—Thuy M. Bui
Attorney, Agent, or Firm—H. W. Oberg; C. H. Castleman, Jr.

[57] ABSTRACT

A tensioner with a pulley rotatably mounted onto a pivot arm where movement of the pivot arm is biased with a compression spring and movement is inhibited with a damping device. The compression spring is articulately mounted in such a manner that the torque output measured at the pivot arm may be substantially constant if so desired.

26 Claims, 1 Drawing Sheet

TENSIONER FOR AN ENDLESS POWER TRANSMISSION MEMBER AND SYSTEM

BACKGROUND OF THE INVENTION

The invention relates to a tensioner for an endless power transmission member such as an endless belt chain or the like, and a power transmission system that includes such a tensioner and power transmission member. More particularly, the invention relates to a spring type tensioner that biases the position of a pivot arm to which a rotatable pulley is mounted. While the tensioner of the invention may be used in various applications for tensioning and endless power transmission member, it is particularly useful in controlling belt tension of a V-ribbed belt as associated with front end accessory drives or a synchronous belt as associated with cam shaft drive systems for automotive applications.

Tensioners of the pivot arm type may use various types of spring bias means such as belville springs, volute springs, compression springs, or torsional coil springs. While the art discloses various types of spring means, the coil torsional spring is in prevalent use today in automotive applications. Examples of such tensioners with torsional springs are disclosed in U.S. Pat. No. 4,473,362 and U.S. Pat. No. 4,696,663. Although such tensioners are in wide spread use in automotive applications for satisfactorily controlling tension in a power transmission belt, the torsional springs used in such tensioners inherently introduce some design application problems which have to be considered for each power transmission system. For example, the torsional spring characteristically is positioned in some fashion about a pivot axis with one end operatively connected to a pivot arm and another end operatively connected to some type of support structure. Such an arrangement inherently introduces a couple about the pivot which must be carried both by the pivot and any pivot bushing that may be used.

Coiled torsional springs inherently introduce a variable force on the pivot arm which force varies in accordance with the spring's rate and consequently, the torque output of the pivot arm varies with the spring rate. Also in such tensioners, a component part of the spring force is typically used to effect variable damping of the pivot arm. In the '362 type of tensioner, a radially inward force results from winding the spring around the pivot and "pinching" an elastomeric bushing to effect a majority of a damping torque reacted at the pivot arm. In the '663 tensioner, a radially outward force is generated by one of the spring ends which is used to press against a shoe type member against a cup to effect a damping torque reacted at the pulley. In both types of tensioners, the damping torque that is generated varies as a function of a spring rate and with movement of the pivot arm.

However, a goal in many tensioning applications is to provide a substantially constant force at a pulley so that a constant tension is achieved in the power transmission member such as an endless belt. To do this, torsional spring type tensioners must be mounted with their pivot arms angled in a geometric manner relative to the belt so that a trigonometric shortening and lengthening of the pivot arm compensates for variations introduced by the coiled torsional spring. Since the same spring is used to provide both a biasing force and a damping force in such tensioner designs, often times an iterative process is used to find a spring that will provide the necessary bias force and generate the necessary damping force for a particular geometric positioning of the pivot arm.

This invention is directed to circumvent the inherent drive design problems associated with coil torsional springs by using a compression spring to bias movement of a pivot arm and a second spring means to effect damping of the pivot arm. An example of a tensioner that uses a compression spring to bias movement of a pivot arm and a separate spring for damping appears in U.S. Pat. No. 4,299,584. In the '584 tensioner, the spring is retained in a tubular spring housing that is fixed to a support structure that does not move with movement of the pivot arm. The housing holds the spring in an aligned position relative to the support structure so that the compression spring like the torsional coil spring of the '362 and '663 patents, introduces a variable force on the pivot arm such that the torque output of the pivot arm varies with the spring rate. Also, the geometric arrangement of the '584 tensioner does not compensate for the variable torque output of the pivot arm and consequently, variable tension levels are introduced into the belt may be undesirable. Furthermore, the damping of the pivot arm is substantially constant because the damping means of a leaf spring exerting a constant force on a pad of friction material; this may be an undesirable combination with the variable torque output of the pivot arm for some drive applications.

SUMMARY OF THE INVENTION

In accordance with the invention, a tensioner is provided that is useful in conjunction with a flexible power transmission member in a drive system. The invention is particularly useful in power transmission belt systems such as those used in synchronous belt drive systems or V-ribbed front end accessory belt drive systems, both used in automotive applications.

The belt tensioner of the invention is of the pivot type with an idler pulley rotatably mounted to a pivot arm, a first spring to bias movement of the pivot arm, and a second or damping spring for inhibiting movement of the pivot arm. In accordance with the invention, a compression spring is used and is interpositioned between a support structure and the pivot arm in such a manner that the spring is permitted to move or articulate to change its effective lever arm or moment arm for all operative movements of the pivot arm. The mounting of a compression spring permits designing a tensioner where the torque output need not vary as a function of the spring rate, but rather, the torque may, in some applications, be designed to be substantially constant. When such a tensioner is used in a power transmission system with a flexible power transmission member, a substantially constant tension may be achieved without special geometric orientations of the tensioner. Alternatively, a geometric orientation may be used in combination with a changing of the moment arm of the spring to effect a new option in designing a tensioner for use in a particular power transmission system.

An advantage of the invention is that since there need be no geometric limitations of tensioner orientation to compensate for changes in torque output of the pivot arm, the tensioner may be fit within small space envelopes not achievable by prior art tensioners.

An object of the invention is to provide a tensioner where constant torque output of the pivot arm may be achieved. An advantage of such an object is that constant damping may be used and that the effects of the bias spring and damping spring may be independently varied for ease in adapting a tensioner to a particular power transmission system.

An advantage of the invention is that a change in spring rate of the pivot arm bias spring does not effect a change in the damping forces and conversely a change in the spring rate of a damping spring does not effect a change in the force of the spring of the pivot arm.

Another object of the invention is to use a compression spring where forces on a pivot may be minimized by reducing loads on the pivot whereby an integrally molded pivot may be used in lieu of a traditionally more expensive and stronger bolt or pin.

These and other objects or advantages of the invention will be apparent after reviewing the drawings and description thereof wherein:

FIG. 5 is a schematic view showing an exaggerated force diagram for a compression spring of the tensioner of FIG. 2.

DESCRIPTION OF PREFERRED EMBODIMENTS

Figure 1:
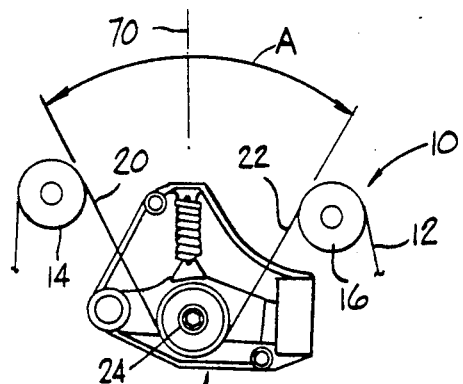
FIG. 1 is a partial schematic front view of a drive system that includes a power transmission member such as a belt and a belt tensioner of the invention.

While various features of the tensioner may be used in several power transmission systems that use a flexible power transmission member, the features are perhaps best described in conjunction with an automotive belt drive. Referring to FIG. 1, a belt drive system 10 is shown with a belt 12 entrained and tensioned around pulleys 14, 16. A tensioner 18 of the invention is interpositioned between belt spans 20, 22 where a pulley 24 engages the belt.

Referring to FIG. 2-5, the belt tensioner 18 is of the spring biased type and includes a support structure 26, a pivot arm 28, and a spring 30 biased between the support structure and pivot arm. The pivot arm 28 is pivotably mounted to the support structure by means of a pivot 32 and an optional, self lubricating polymeric sleeve-type bearing or bushing 34 that includes a thrust flange 36.

The pulley 24 is rotatably mounted to the pivot arm such as by means of a roller ball bearing 38 and is operative at a moment arm or lever arm LP from the pivot 32 as the pulley moves with the arm structure in pressing engagement against the belt.

The spring is a compression spring and is interpositioned between a post 38 of the support structure and is operative at a variable moment or lever arm LA, LB which is hereinafter further explained. The spring is mounted to the support structure and pivot arm so that the spring articulates with movements of the pivot arm and operates at a moment arm LA, LB that varies in length with articulated movements of the spring. The moment arm shortens with a shortening of length of the compression spring and lengthens with a lengthening of the compression spring as the pivot arm is pivoted. This is diagrammatically shown in FIG. 7 where the spring and its moment arm in one position is shown in solid form and, when pivoted, is shown in dotted form. Satisfactory combinations can be obtained where the length of the moment arm relative to the compressed length of the spring are from about 80 to 100 percent of each other.

Figure 3:
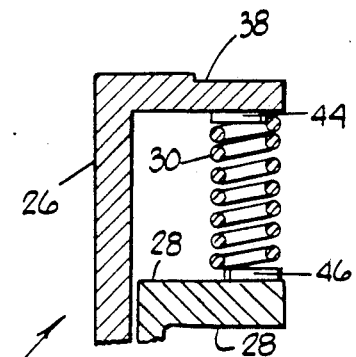
FIG. 3 is a view taken along the line 3—3 of FIG. 2.
Figure 2:
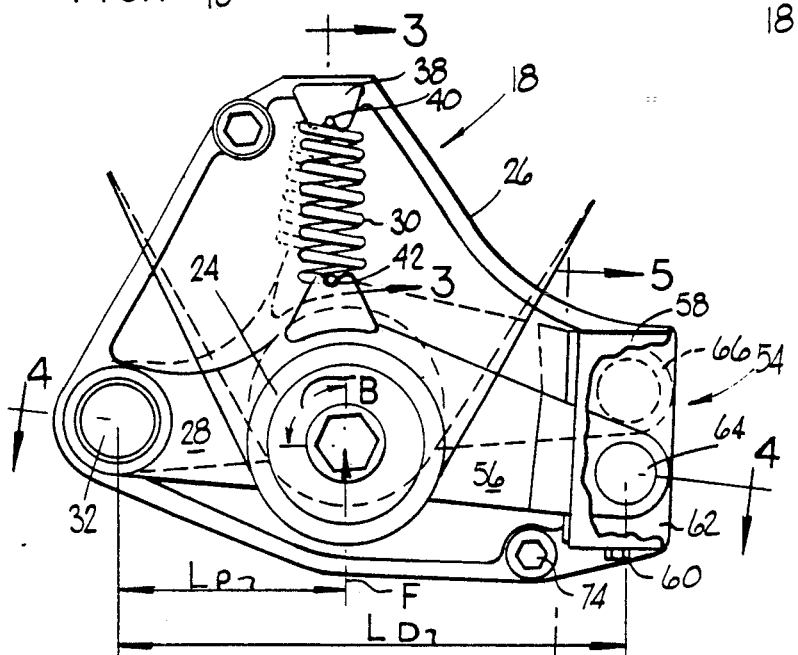
FIG. 2 is an enlarged partially broken away view of the belt tensioner of FIG. 1.

Various means may be used for articulately mounting the spring to the support structure and pivot arm. A preferred means is illustrated in FIGS. 2 and 3. The post 38 of the support structure has a projection that includes a slot 40 that is substantially parallel to the pivot. Similarly, a projection on the pivot arm has a slot 42 which is also substantially parallel to the pivot. As best shown in FIG. 3, each end of the spring has an extension 44, 46, that fits in one of such slots. The slots, being substantially parallel with the pivot, allows the extended portions of the spring at each end to slightly rotate in each slot as the spring articulates to a new position as shown in dotted form in FIGS. 2 and 7.

Figure 6:
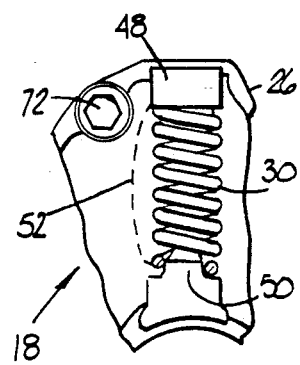
FIG. 6 is a partial and partly broken view of FIG. 2 in the vicinity of line 3—3 showing alternate means for mounting a spring.

Additional examples of means for articulately mounting the spring are illustrated in FIG. 6. One such means is in the form of a cup 48 having an inside diameter that is larger than the spring diameter so that the end portion of the spring may be inserted in the cup for retention. Another means for articulately mounting the spring is a boss 50 having an outside diameter less than the inside diameter of the spring so that the post may be inserted into one end portion of the spring. In such articulate mountings, the spring may slightly bow as illustrated by the dotted line as the pivot arm reciprocally moves between its operative positions.

A damping means 54 is included for inhibiting movement of the pivot arm and hence, the pulley against the belt when in use. The damping means includes a leg or lever extension 56 of the pivot arm, a damping spring 58 attached 60 to the support structure, a surface 62 of the support structure and a pad 64 of friction material. The leg 56 as an extension of the pivot arm structure, pivotably moves therewith in an arcuate damping zones as shown between the two positions in FIG. 1 and bounded by dotted lines 66. The damping spring may be a compression spring or is preferably in the form of a U-shaped leaf spring with a leg portion 68 juxtaposed the damping zone.

Figure 4:
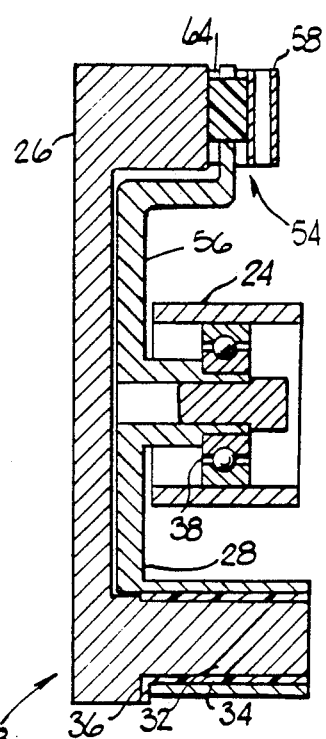
FIG. 4 is a view taken along the line 4—4 of FIG. 2.

While the pad of friction material may be attached to the surface 62 of the support structure or the leg 68 of the spring 58, it is preferably carried by the leg 56. It is preferred that the leg have an aperture through which the pad of friction material is disposed and protrude at its opposite ends from oppositely facing sides of the leg portion as is shown in FIG. 4. In such an arrangement, the opposite ends of the pad are in friction surface sliding contact with the face 62 of the support structure and leg 68 of the spring. An advantage of positioning the friction material in the aperture of the leg is that it defines a means to adjust to a zero clearance between the arcuate movement of the leg portion and the surface of the support structure.

The pad of friction material may be of any chosen type but it optionally may be in the form of a polymeric material such as that sold under the trademark Delrin which exhibits a starting (static) friction that is less than its sliding (dynamic) friction.

The leaf spring 58 in contact with the polymeric pad and surface, provides substantially a constant damping force at a moment arm or lever LD in relation to the pivot 32. Preferably, the moment or lever arm LD for the damping means is greater than the operative moment arm between LA, LB for the spring to minimize the damping spring force while simultaneously precisely controlling the damping torque of the tensioner.

Figure 5:
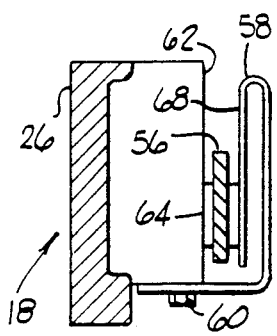
FIG. 5 is a view taken along the line 5—5 of FIG. 2.

As illustrated by the vertical alignment of the support structure of FIGS. 3, FIG. 4, and FIG. 5, the spring 30, the damping means with leg 56, friction pad 64, and spring 58, are in substantially planer alignment for the advantage of minimizing or eliminating offset moments that could occur if such elements were not in alignment. Such an arrangement has the advantage of minimizing bearing sizes, pivot sizes, spring sizes and the like.

Use

In use, the tensioner 18 of the invention is positioned so that the pulley 24 is pressed against the belt forming spans 20, 22 that have an included angle A and define a line 70 that bisects such angle. The tensioner 18 may be held in its drive position such as by means of fasteners such as bolts 72, 74. The belt 22 imparts a force F that is substantially along the line 70 which bisects the angle A. Preferably, but optionally, the pivot arm is aligned at an angle B but is from about 80 to about 100 degrees relative to the force F on the pulley.

Figure 7:
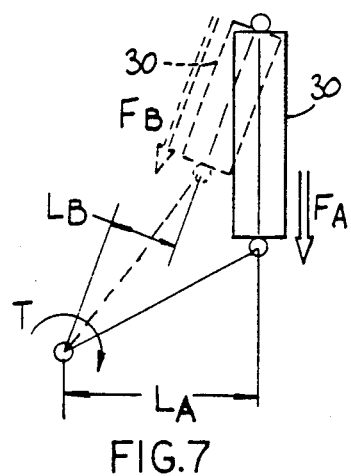

As best illustrated with reference to the force diagram of FIG. 7 and in conjunction with the motion illustrated by dotted lines in FIG. 2, the spring 30 exerts a force FA on the pivot arm at an operative moment or lever arm LA. As the pivot arm is moved to a second position, the spring shortens as illustrated by the dotted form in FIG. 7 and exerts a force FB at a shorter moment or lever arm LB. The moment arm varies in length with articulated movements of the spring where the moment arm shortens with a shortening of length of the compression spring, and lengthens with a lengthening of the compression spring as the pivot arm is pivoted. As a compression spring, the spring exerts a force FA, FB on the pivot arm that substantially lineally varies with the compressed length of the spring. More preferably, the mean product of the spring force and moment arm throughout the travel of the pivot arm is substantially constant. By making the means product of the spring force and moment arm substantially constant, the tensioner arm of the invention receives a substantially constant torque that is reacted at the pulley by an equal and opposite constant belt tension. The leaf spring operating on the friction pad provides a damping force at the pulley which is also substantially constant.

As shown in FIG. 2, the spring exerts a force on the pivot arm that is in a general direction of the pulley. The spring does not introduce a couple into the pivot or the pivot bushing and consequently, the pivot may be made without the need of a high strength or hardened part. As shown in FIG. 4, the pivot is an integrally molded part of the support structure and may be made of a lower strength material than steel such as aluminum or alloys thereof.

The foregoing example of use is illustrative of a geometric alignment where the pivot arm need not be angularly disposed so that a trigonometric foreshortening of the pivot arm is required to compensate for nonlinear torque outputs of the pivot arm. However, the principles of the invention may be used so that the geometry of the pivot arm as well as the articulated spring of the invention may be used in conjunction with each other to effect another solution to tensioner application problems.

The foregoing detailed description is made for the purpose of illustration only and is not intended to limit the scope of the appended claims.

What is claimed is:

1. In a tensioner for tensioning a flexible power transmission member and of the type with a support structure, a pivot arm pivotably mounted with a pivot to the support structure, pulley means rotatably mounted to the pivot arm for engaging the power transmission member and a spring means between the support structure and pivot arm for biasing the position of the pivot arm, and means for damping movement of the pivot arm, the improvement comprising:
   the spring means being a compression spring having opposite ends, and a compressed length that varies with pivotal movements of the pivot arm;
   means for articulately mounting the spring to the support structure and the pivot arm at a moment arm that varies in length with articulated movements of the spring where the moment arm 1) shortens with a shortening of length of the compression spring, and 2) lengthens with a lengthening of the compression spring as the pivot arm is pivoted.

2. The tensioner as claimed in claim 1 wherein the means for articulately mounting the spring comprises:
   a projection on the support structure having a slot substantially parallel to the pivot;
   a projection on the pivot arm having a slot substantially parallel to the pivot; and
   each end of the spring having an extension that fits in one of the slots.

3. The tensioner as claimed in claim 1 wherein the length of the moment arm relative to the compressed length of the spring are from about 80 to about 120 percent of each other.

4. The tensioner as claimed in claim 1 wherein the spring exerts a force on the pivot arm that substantially lineally varies with the compressed length of the spring, and the mean product of the spring force and moment arm varies less than substantially 10 percent with pivotal movements of the pivot arm moves.

5. The tensioner as claimed in claim 4 wherein the mean product of the spring force and moment arm is substantially constant.

6. The tensioner as claimed in claim 5 wherein the spring exerts a force in a general direction toward the pulley.

7. The tensioner as claimed in claim 6 wherein the pivot is an integral molded part of the support structure.

8. The tensioner as claimed in claim 1 wherein the damping means comprises:
   a pad of friction material attached to the pivot arm at a second moment arm from the pivot arm; and
   means for pressing the pad into contact with the support structure to effect a damping force.

9. The tensioner as claimed in claim 8 wherein the second moment arm is greater than the variable moment arm of the spring.

10. The tensioner as claimed in claim 9 wherein the pressing means is a leaf spring.

11. The tensioner as claimed in claim 1 wherein the rotatable mount for the pulley, the variable moment arm for the spring and the damping means are in a substantially constant plane.

12. The tensioner as claimed in claim 1 wherein the means for articulately mounting the spring comprises:

a projection on the support structure having a boss with an outside diameter that is less than an inside diameter of the spring;

a projection on the pivot arm having a boss with an outside diameter that is less than the inside diameter of the spring; and each end of the spring having a portion that located over each of said bosses.

13. The tensioner claimed in claim 1 wherein the means for articulately mounting the spring comprises:

a projection on a support structure in the form of a cup having an inside diameter less than an outside diameter of the spring;

a projection on the pivot arm in the form of a cup having an inside diameter less than the outside diameter of the spring; and each end of the springs having a portion that fits into one of said cups.

14. In a drive system of the type with a flexible power transmission member entrained around pulleys and tensioned between two spans of the power transmission member by means of a tensioner of the type with a support structure, a pivot arm pivotably mounted with a pivot to the support structure, pulley means rotatably mounted to the pivot arm for engaging the power transmission member, and a spring means between the support structure and pivot arm for biasing the position of the pivot arm, and means damping movement of the pivot arm, the improvement comprising:

the spring means being a compression spring having opposite ends, and a compressed length that varies with pivotal movements of the pivot arm;

means for articulately mounting the spring to the support structure and the pivot arm at a moment arm that varies in length with articulated movements of the spring where the moment arm 1) shortens with a shortening of length of the compression spring, and 2) lengthens with a lengthening of the compression spring as the pivot arm is pivoted.

15. The drive system as claimed in claim 14 wherein the belt spans impart a force on the pulley that is substantially along a line that bisects an angle formed by the spans, and the pivot arm is aligned from about 80 to about 100 degrees to the force on the pulley.

16. The drive system as claimed in claim 14 wherein the length of the moment arm relative to the compressed length of the spring are from about 80 to 120 percent of each other.

17. The drive system as claimed in claim 14 wherein the spring exerts a force on the pivot arm that substantially lineally varies with the compressed length of the spring, and the mean product of the spring force and moment arm varies less than substantially 10 percent with pivotal movements of pivot arm.

18. The drive system as claimed in claim 17 wherein the mean product of the spring force and moment arm is substantially constant.

19. The drive system as claimed in claim 17 wherein the spring exerts a force in a general direction toward the pulley.

20. The drive system as claimed in claim 19 wherein the pivot is an integrally molded part of the support structure.

21. The drive system as claimed in claim 17 wherein the damping means comprises:

a pad of friction material attached to the pivot arm at a second moment arm from the pivot arm; and means for pressing the pad into contact with the support structure to effect a damping force.

22. The drive system as claimed in claim 21 wherein the second moment arm is greater than the variable moment arm of the spring.

23. The drive system as claimed in claim 22 wherein the pressing means is a leaf spring.

24. The drive system as claimed in claim 23 wherein the spring exerts a force on the pivot arm that substantially lineally varies with the compressed length of the spring, and the product of the spring force and moment arm for the spring varies less than substantially 10 percent as the pivot arm moves.

25. The drive system as claimed in claim 24 wherein the tensioner exerts a substantially constant damping torque that is reacted at the pulley against the belt, and the damping force at the pulley is substantially constant.

26. The drive system as claimed in claim 14 wherein the rotatable mount for the pulley, the variable moment arm for the spring and the damping means are in a substantially constant plane.

* * * * *